US007503243B2

(12) United States Patent
Putsch

(10) Patent No.: US 7,503,243 B2
(45) Date of Patent: Mar. 17, 2009

(54) PLIERS THAT CAN BE OPERATED WITH ONE HAND

(75) Inventor: Ralf Putsch, Wuppertal (DE)

(73) Assignee: Knipex-Werk C. Gustav Putsch KG, Wuppertal (DE)

( * ) Notice: Subject to any disclaimer, the term of this patent is extended or adjusted under 35 U.S.C. 154(b) by 13 days.

(21) Appl. No.: 10/557,556

(22) PCT Filed: May 24, 2004

(86) PCT No.: PCT/EP2004/005537

§ 371 (c)(1), (2), (4) Date: Dec. 18, 2006

(87) PCT Pub. No.: WO2004/103646

PCT Pub. Date: Dec. 2, 2004

(65) Prior Publication Data

US 2007/0169592 A1 Jul. 26, 2007

(30) Foreign Application Priority Data

May 22, 2003 (DE) ................................ 103 23 083
Sep. 19, 2003 (DE) ................................ 103 43 412

(51) Int. Cl.
*B23B 7/04* (2006.01)

(52) U.S. Cl. .......................... 81/409.5; 81/411; 81/412; 81/413

(58) Field of Classification Search ................ 81/409.5, 81/411, 412, 413
See application file for complete search history.

(56) References Cited

U.S. PATENT DOCUMENTS 4,438,669 A * 3/1984 Hastings et al. ............ 81/409.5
4,651,598 A * 3/1987 Warheit ....................... 81/407
5,850,768 A 12/1998 Chow

FOREIGN PATENT DOCUMENTS

| | | |
|---|---|---|
| DE | 298 03 998 | 5/1998 |
| DE | 203 02 867 | 5/2003 |
| WO | WO 00/13856 | 3/2000 |

* cited by examiner

*Primary Examiner*—Joseph J Hail, III
*Assistant Examiner*—Shantese McDonald
(74) *Attorney, Agent, or Firm*—Lucas & Mercanti, LLP

(57) ABSTRACT

Pliers (1) operable with one hand have two plier legs (2, 3), which pivot in relation to one another about an engagement bolt (4) and overlap one another in a crossover region. The plier legs (2, 3) are connected by a control element (13) and a spring drive (12), which pretensions a mouth of the pliers into an open position. The control element (13) has two links (15, 16) that are connected to one another in the manner of a toggle lever by means of a toggle joint. A spring (14) pretensions the links (15, 16) into an extended position, wherein the spring (14) can be changed in its length. The engagement bolt is inserted into the pliers legs during a spreading of the pliers legs.

19 Claims, 15 Drawing Sheets

PLIERS THAT CAN BE OPERATED WITH ONE HAND

FIELD AND BACKGROUND OF THE INVENTION

The invention relates to pliers that can be operated with one hand, comprising two pliers legs, which pivot in relation to one another about an engagement bolt when a force is applied, the pliers legs also overlapping one another in a crossover region, a pliers mouth being formed on one side of the crossover region of the pliers legs and grip portions being formed on the pliers legs on the opposite side, below the crossover region, the pliers legs also being connected by means of a control element and a spring drive, which pretensions the pliers mouth into an open position, which open position is attained automatically in a spring-loaded manner once the grip portions are released; moreover, in a first phase of movement of the spring drive, the pliers-mouth jaws moving toward one another and, in a second phase of movement, a catch of the engagement bolt engaging in a latching tooth formation, it being possible for a forced rotation of the movable pliers-mouth jaw to be carried out about the engagement bolt; the control element comprising two links that are connected to one another in the manner of a toggle lever by means of a toggle joint and, associated at least with one link, a spring being provided, which, while being supported on the links, pretensions the links into an extended position and, as a result, brings about, if appropriate, the disengagement of the movable pliers leg from the tooth formation and in any event the moving of the movable pliers leg into the greatest open position of the mouth by means of the spring drive created in this way.

Pliers of this kind that can be operated with one hand are known from WO 00/13856. The spring is formed there, FIG. 20, as a rotary leg spring and is associated with the links that are connected to one another in the manner of a toggle lever, mounted at the toggle-joint pin. The accommodating space is in this case formed by the U space of the links of the control element that are correspondingly folded in a U-shaped manner.

SUMMARY OF THE INVENTION

It is an object of the invention to make the control element more compact and externally sealed.

This object is achieved first and foremost in the case of pliers that can be operated with one hand by features of the invention, it being provided that the spring is a compression spring which can be changed in its length along the longitudinal direction of one of the links and which, when activated in an axial direction, acts on the other link eccentrically in relation to the toggle joint. A configuration of this kind results in pliers that can be easily handled. The means by which the spring drive stores energy are provided by a compression spring integrated into the toggle lever. The spring is accommodated on components that are present in any case, i.e. on the toggle lever. They are positioned in relation to one another in such a way as to allow the compression spring to be guided along the greatest possible length; it can be changed in its length in the longitudinal direction of the link. If accommodated internally, there is good, guiding support. The compression spring and the links of the toggle lever are in this case aligned in relation to one another in such a way as to achieve an eccentric direction of action with respect to the toggle lever, to be precise with allowance for the switching over typical during operation from spring drive and controlling action into the collapsing toggle lever contour. It is preferred to resort to a helical compression spring. One is sufficient. If a greater force is required, two helical compression springs inserted one in the other may also be provided for one of the links. This is of interest for example if the toggle lever is to be particularly close to the crossover region, in which case smaller lengths are available for the links. In an extreme case, instead of the typical circular cross-sections of the turns of the spring, flattened cross-sections, for example elliptical cross-sections, may be used, the longer axis of the ellipse lying substantially perpendicular to the direction in which the compression spring acts.

Further subject matters of the invention are explained below. Thus it is further provided that the compression spring is accommodated inside a first link. Such a link accordingly assumes the function of a spring chamber. For all practical purposes, it forms the housing for an energy storing means. By being formed appropriately, the compression spring may be realized directly as a pressure-exerting piece interacting with the second link; however, a configuration in which the compression spring acts on a second link by means of a separate pressure-exerting piece is preferred. In this case it is ensured that, with regard to the eccentric effect, the pressure-exerting piece shifts the introduction of force into the other link to outside the toggle lever. The location of the force introduction away from the toggle-joint pin is situated on the folding-together side, that is on the mouth side, of the toggle joint. Returning to the relative position of the pressure-exerting piece, it is also proposed that the pressure-exerting piece has a neck introduced into the cavity of the compression spring. Said neck extends with freedom to pivot in the compression spring. Allowing for the toggle lever action, it proves to be advantageous that the pressure-exerting piece, mounted on the second link with respect to the support there by positive engagement over it, is secured in a step. In this case, the step may lie in such a way that a defined angular position of the links in relation to one another is obtained, maintained or brought about by the action of the preferably pretensioned compression spring. In any event, the step is formed in the region of the support there in such a way as to prevent the pressure-exerting piece from slipping out in the upward direction, i.e. on the mouth side. It also proves to be advantageous that the first link is mounted on the one hand on the movable pliers leg and on the other hand on the second link. These are points of articulation. Furthermore, it is provided that the first link is longer than the second. The spring chamber for the compression spring may be of a corresponding length. Moreover, an advantageous feature of the invention is that a longitudinal axis of the compression spring is not in line with the straight connecting line between the two points of articulation of the first link. This produces a self-contained system of forces of the control element and also proves to be advantageous in structural terms, in particular in saving space. To do away with the bulky open position, it is proposed that a closed position of the pliers, in the unused state, can be secured by a blocking part that can be pivoted into a path of movement of the first link. In this way, part of the toggle joint is given a useful additional function,that is the function of forming a securing means. This securing means is optimized by the associated engagement areas of the blocking part and of the first link extending in a plane which forms a secant with respect to a circle of the point remote from the pivoting axis of the blocking part. This produces an elevation with a blocking effect. To release the closed position, the pliers legs just have to be brought slightly toward one another. Then the blocking part can be disengaged by hand, released by the effect of gravity or else brought out of the way by exerting centrifugal force on it.

The invention then relates to pliers that can be operated with one hand, comprising two pliers legs, which pivot in relation to one another about an engagement bolt when a force is applied, the pliers legs also overlapping one another in a crossover region, a pliers mouth being formed on one side of the crossover region of the pliers legs and grip portions being formed on the pliers legs on the opposite side, below the crossover region, the pliers legs also being connected by means of a control element and a spring drive, which pretensions the pliers mouth into an open position fixed by the control element and/or the spring drive, which open position is attained again automatically in a spring-loaded manner once the grip portions are released; moreover, in a first phase of movement of the spring drive, the pliers-mouth jaws moving toward one another and, in a second phase of movement, a catch of the engagement bolt engaging in a latching tooth formation, after which a forced rotation of the movable pliers-mouth jaw can be carried out about the engagement bolt; and, as a development, it also proposes that the engagement bolt can be inserted into the pliers legs in an assembly position which is characterized by spreading of the pliers legs beyond the fixed open position, and that the engagement bolt is mounted with positive engagement by the pliers legs in the fixed open position. The corresponding fitting by positive engagement is secured by existing components; there is no need for riveting or screwing of the engagement bolt. Therefore, the explained toggle lever also acts as a control member for disassembly, as the last means of preventing overspreading. In other words, the fitting of the engagement bolt by insertion takes place in a maximum spread position of the pliers legs, which lies outside the operational spread position, fixed by the control element. From a structural viewpoint, the procedure adopted here is that the engagement bolt is pivotably mounted in the passing-through pliers leg, to be precise pivotable to a restricted extent on account of the width of the longitudinal slit of the passing-through pliers leg, and that the joint bolt has a blocking portion, which only permits removal of the engagement bolt when an exit opening of the passed-through pliers leg is in line with an associated clearance of the passing-through pliers leg. It is also necessary for them to be correspondingly in line during assembly, the clearance, similar overall to an angled slit, being used with respect to the desired fixing. Moreover, it proves to be structurally advantageous that the wall areas of the passed-through pliers leg that delimit a free space for a fitted-through connection of the pliers legs assume a clear distance from one another corresponding to the axial length of the blocking portion. Moreover, it is provided that the extreme end of the blocking portion remote from insertion is engaged over by the corresponding wall area in such a way as to prevent it leaving. This produces satisfactory axial securement/support of the engagement bolt. Finally, it is proposed that the engagement bolt, of a three-step diameter, decreasing in the direction of entry, carries the blocking portion in the region of the middle step. An advantageous configuration is ultimately obtained by the blocking portion being formed as a radial finger. Said finger can be formed on the engagement bolt without any problem.

BRIEF DESCRIPTION OF THE DRAWINGS

The subject matter of the invention is explained in more detail below on the basis of a pictorially illustrated exemplary embodiment. In the drawing.

DETAILED DESCRIPTION OF THE PREFERRED EMBODIMENT(S)

Figures 1, 2:
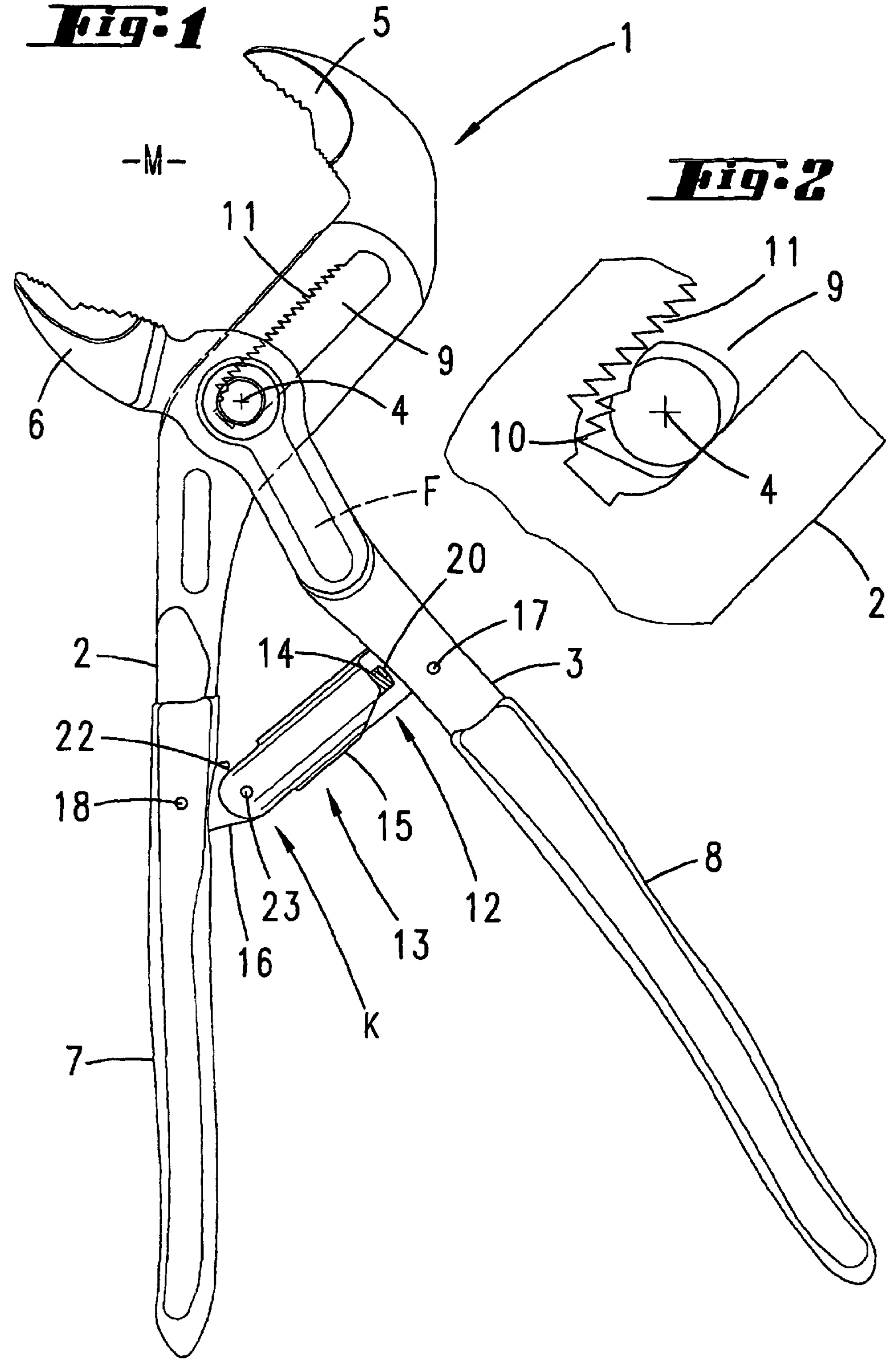
FIG. 1 shows the pliers in side view in the spring-loaded basic position, showing a basic version.
FIG. 2 shows an enlargement taken from FIG. 1, illustrating the position of the engagement bolt.
Figure 4:
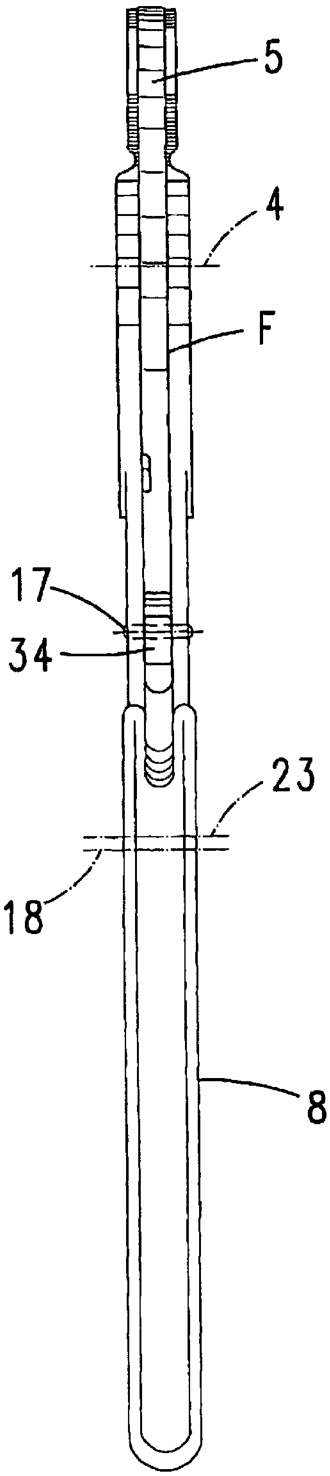
FIG. 4 shows the rear view of the pliers.

The pliers 1 that can be operated with one hand have two pliers legs 2, 3 crossing over one another. The latter are connected pivotably with respect to one another in the crossover region by means of an engagement bolt 4 representing a joint bolt.

Above said crossover region of the pliers legs 2, 3 there is a pliers mouth M. In terms of a gripping mechanism, it is formed by a pliers-mouth jaw 5 of the pliers leg 2 and a pliers-mouth jaw 6 of the pliers leg 3.

Below the crossover region defined by the engagement bolt 4, the pliers legs 2, 3 merge with elongate grip portions 7, 8.

The engagement bolt 4 passes through a longitudinal slit 9 of the pliers leg 2. The engagement bolt 4 is mounted in the pliers leg 3 passed through by the pliers leg 2.

Figure 5:
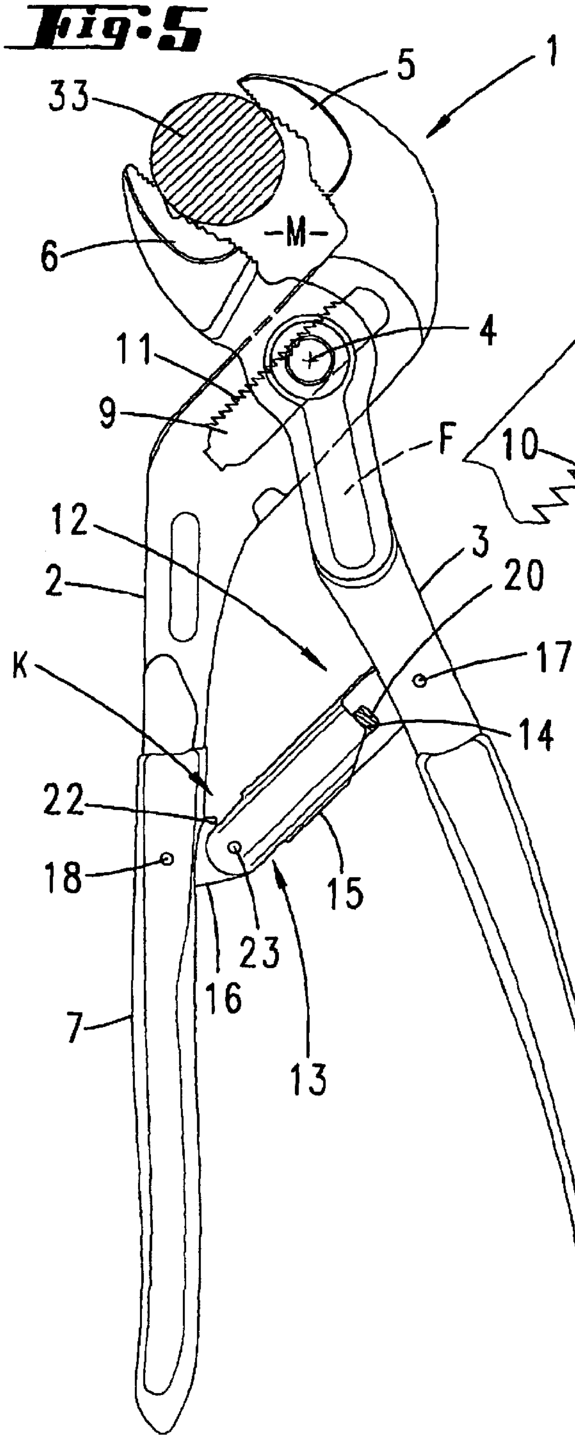
FIG. 5 shows the pliers in side view, with a gripped object.
Figure 6:
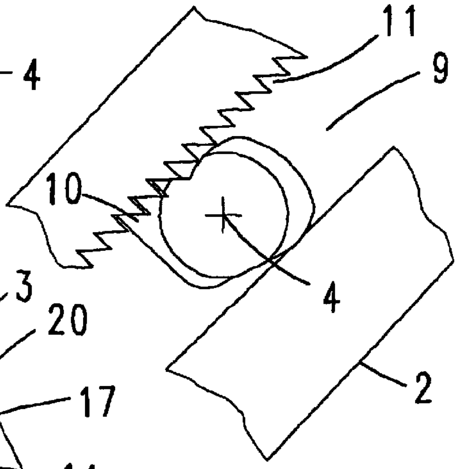
FIG. 6 shows an enlargement as in FIG. 2, showing the now applicable position of the engagement bolt.

The engagement bolt 4 carries a catch 10. Said catch interacts with intertooth spaces 11 of a tooth profiling of the passing-through pliers leg 2, said profiling lying on the pliers mouth side. FIG. 2 shows the unlatched position that is applicable in FIG. 1, FIG. 6 shows the latched position that is represented in FIG. 5 of the latching tooth formation 10/11. It can be gathered that this is realized in a sawtooth structure, acting in a blocking manner in the gripping state.

To change the size of the pliers mouth M, the corresponding fitted-through connection has a matching free space F. Said free space is located on the passed-through pliers leg 3.

The pliers 1 are kept in the basic position with the mouth open by means of a spring drive 12 (cf. FIG. 1). For this purpose, the spring drive 12, accommodated in the interspace between the pliers legs 2, 3, acts in such a way as to make the pliers legs spread. The end position is defined by the engagement bolt 4 or its catch 10 butting against the lower end of the slot-like longitudinal slit 9.

The spring of the spring drive 12 is designated by 14. It is a compression spring, a so-called helical compression spring, wound linearly with a cylindrical winding "shell".

Figure 3:
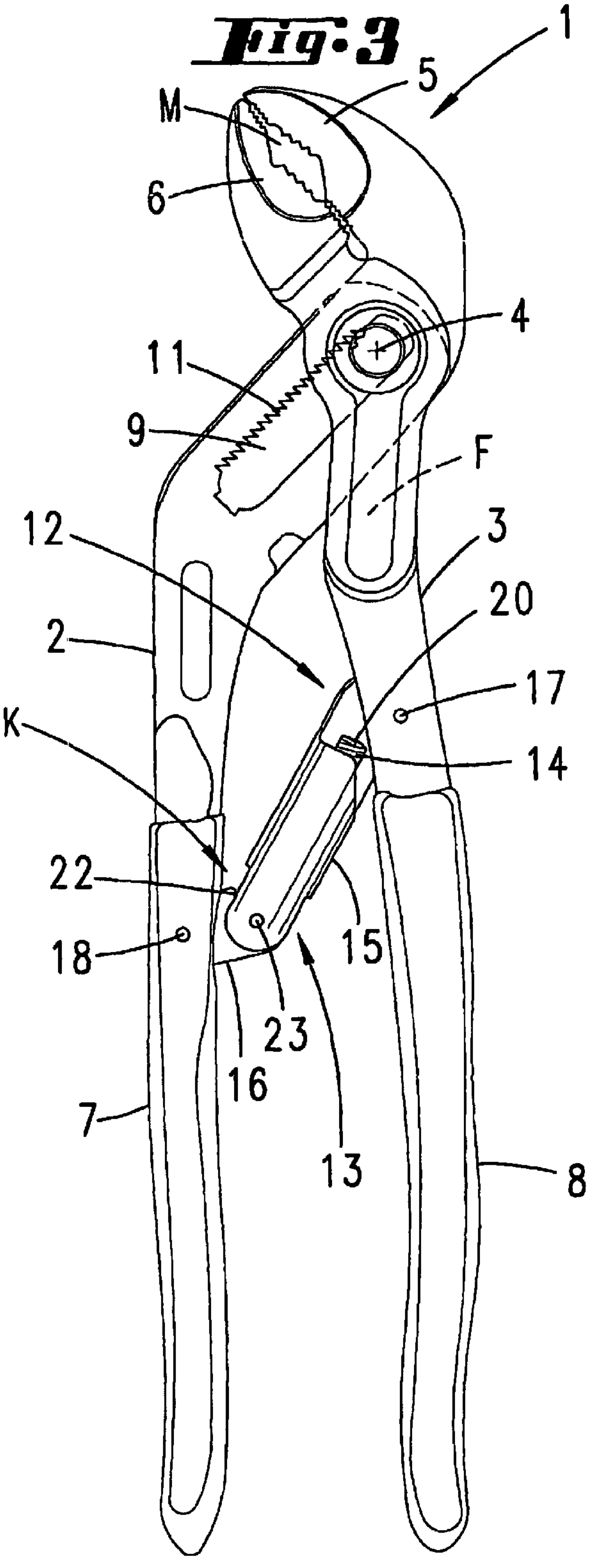
FIG. 3 shows the pliers in side view, closed.

The spring drive 12 is under pretension. To this extent, the open position (FIG. 1) is pretensioned in a manner that is effective but can be overcome; and the spring drive 12 acts at the same time as a control element 13. While closing the spread pliers legs 2, 3, the pliers jaw 6 of the displaceably and pivotably mounted pliers leg 3 is shifted in the direction of the pliers jaw 5 of the stationary passing-through pliers leg 2. This is evident from FIG. 3. The open position according to FIG. 1 is accordingly obtained fully automatically as a result of the described spring loading after release of the grip portions 7, 8 of the pliers legs 2, 3.

Supported by the passing-through pliers leg 2, the control element 13 protrudes in a freely extending manner on the interstitial side. It forms a kind of extension arm, the pliers-mouth jaws 5, 6 moving toward one another in a first phase of movement of the spring drive 12 and the catch 10 of the engagement bolt 4 engaging in the intertooth gaps 11 in a second phase of movement. After that, a forced rotation of the movable that is passed-through, pliers leg 3 or its pliers-mouth jaw 6 can be carried out about the engagement bolt 4. This involves overlaid movements of a multi-element joint.

Figure 7:
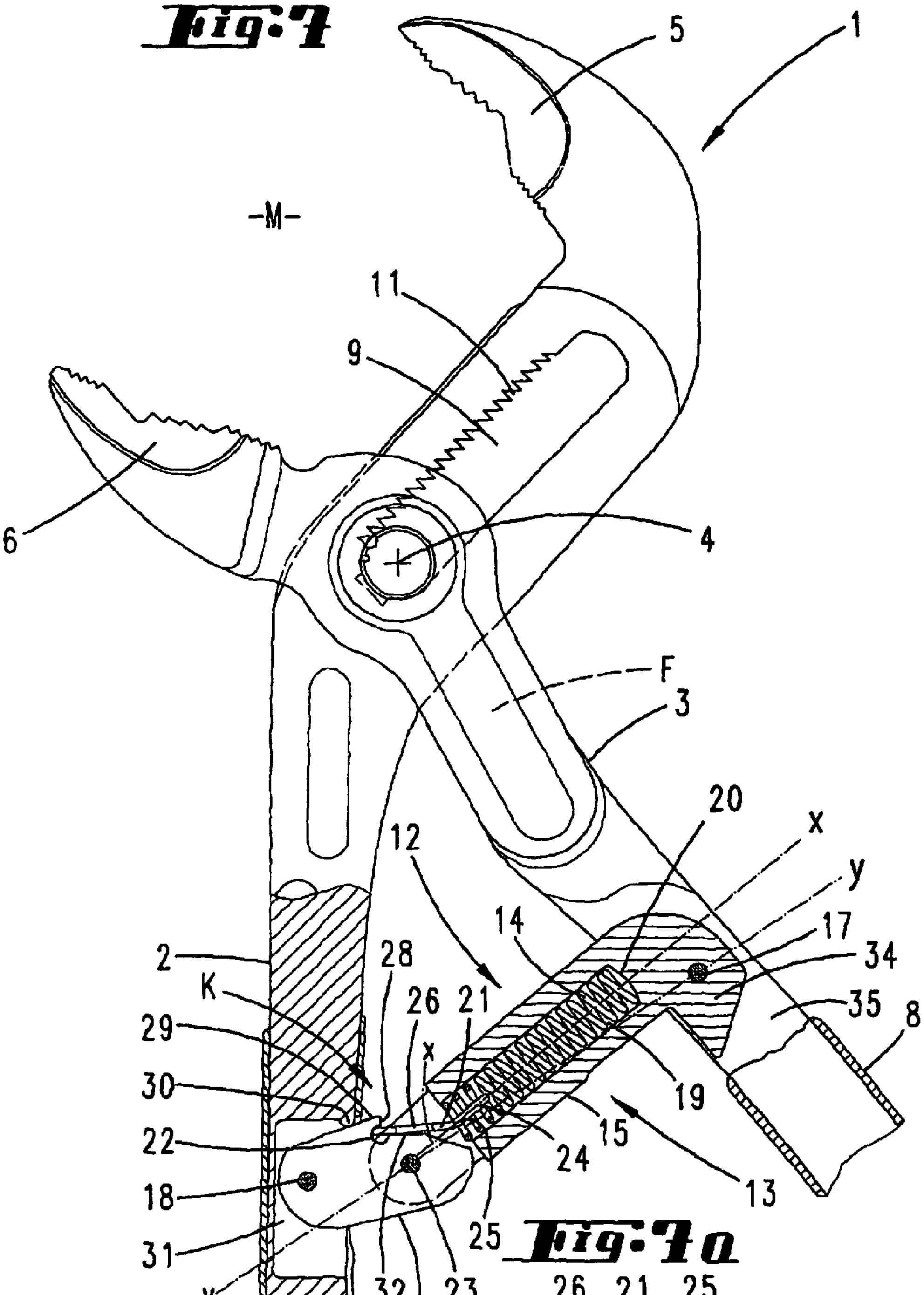
FIG. 7 shows an enlargement of FIG. 1 with the control element cut opening.
Figure 7A:
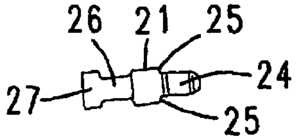
FIG. 7*a* shows the pressure-exerting piece associated with the compression spring on its own, to be precise in a plan view.

The control element 13 also comprises for this purpose two links 15, 16, which are connected to one another in the manner of a toggle lever. The spring 14, realized as a compression spring, is associated with one of these links 15, 16, here the link 15. The pretensioned spring 14 is supported on the links 15, 16. The obtuse-angled toggle lever or the toggle joint K is illustrated by FIGS. 1 and 7. The correspondingly pretensioned extended position, in the sense of a maximum toggle lever opening, brings about both the disengagement of the movable pliers leg 3 from the tooth formation 11 and the moving of the movable pliers leg 3 into the greatest open position of the mouth by means of the spring drive 12 created.

The longer link 15 acts at the end of the movable, that is passed-through, pliers leg 3 by means of a joint pin 17. The other link 16 is in connection with the passing-through pliers leg 2 by means of a joint pin 18.

The joint pins 17, 18 lie at different distances from the crossover region of the pliers legs 2, 3, that is from the engagement bolt 4. The joint pin 17 of the link 15 lies closer to said reference point (cf. FIG. 1), and in the position according to FIG. 3 even significantly closer.

The links 15, 16 are realized as substantially linear components and are of different lengths. The first link, that is the one designated by 15, is longer than the second. The ratio is 3:1.

The spring 14 or compression spring is accommodated inside the first link, that is the longer link 15. The corresponding spring chamber has the reference numeral 19. It is a bore configured substantially concentrically in relation to the outer wall of the link 15 having a tubular portion. The clearance of the same allows for adequate axial freedom of movement of the spring body in the spring chamber 19. Disposed eccentrically, the spring chamber 19 could also be formed more in the direction of the pliers mouth M.

The spring chamber 19, configured in the manner of a blind bore, offers a support 20 at the base of the bore for the end winding there of the helical compression spring. Unlike the manner in which it is represented, the spring chamber 19 may also be formed in such a way that it is closed in the region of the support 20.

The support in the opposite direction, facing the shorter link 16, is indirect, to be precise by means of a separately formed pressure-exerting piece 21. The support is designated by 22 (cf. FIG. 7). On the other hand, the end winding facing the point of articulation of the two links 15, 16, connected to one another in the manner of a toggle lever, could be shaped in such a way as to form a pressure-exerting piece 21 of this kind.

Said point of articulation between the two links 15, 16 is realized by a toggle-joint pin 23 incorporated spatially parallel to the joint pins 17, 18.

Since the spring 14 is accommodated in the spring chamber 19 captively and under pretension, the pressure-exerting piece 21 can be insertably associated with the spring body without concern. For this purpose, it has a neck 24 directed toward the spring 14. Said neck is inserted into the cavity of the compression spring. Reference may be made for example to FIG. 7. The neck 24 is adjoined, facing away from the spring, by a widened shoulder 25 of a symmetrical configuration. Resting in a supported manner on the latter is the end winding of the spring 14 lying closer to the toggle-joint pin 23. Between the neck 24 and the shoulder 25, the body of the pressure-exerting piece 21 is angled away at an obtuse angle (cf. FIGS. 7 and 8). Such a pressure-exerting piece 21 may both consist of plastic and also be realized as a cast part, if appropriate a forged part.

The widened shoulder 25 of the pressure-exerting piece 21 is then adjoined by a stem-like portion 26. The latter ends in a widened, shovel-like blade 27. The straight narrow edge of said blade butts against the support 22. The latter is—as stated—formed as a notch, so that the pressure-exerting piece 21 is mounted on the second link 16 by positive engagement over it, to be more precise secured on a step 28. With respect to the support 22, there is a kind of undercut contour. This is also already adequate on its own. It is only as an advantageous measure that the notch is additionally formed. It has been found in practice that even the undercut is not necessary. To this extent, an undercut-free, step-like graduation is also hereby incorporated in the disclosure. The support of the pressure-exerting piece 21 loaded by the spring force exerts a load on the longer link 15 in the clockwise direction. Said load draws the pliers leg 3 toward the grip. If the joint pin 17 is pulled, the link 15 pivots a few degrees in this direction, that is until the pretension is used up.

It can be gathered that the step 28 is delimited by an upper flank 29, facing the pliers mouth M. Said flank interacts with a fixed rotation stop 30, provided for example by a corner edge on the interstitial side or some other wall portion of a mounting compartment 31 of the pliers leg 2 (cf. FIG. 7). The toggle lever K is supported on said portion. A pin, for example, may also be incorporated as a stop.

The support 22, realized in the form of a hollow notch, is basically formed in a circular manner. It opens in the form of a sector facing the pliers mouth M. The sector encloses an angle of somewhat more than 90°. The material of the link 16 that extends beyond the circular wall of the notch thereby forms the already mentioned step 28. The latter extends vertically and in such an overhanging manner that, even when the tool is dropped, the pressure-exerting piece 21 does not fall out from its simple inserted anchorage.

The vertex of the sector coincides with the radius point of the circular notch or support 22. The lower flank, horizontally delimiting the step 28, represents a kind of parapet 32. This allows for the space requirement of the pressure-exerting piece 21. The shovel-like blade 27 can rest on it. Facing away from the notch, the parapet 32 becomes increasingly remote from the stem-like portion 26 of said part.

It can be gathered that the described contour of the toggle lever K has the effect that, when activated in an axial direction, the spring 14, which can be changed in its length in the longitudinal direction of the one link 15, that is the compression spring, acts on the other link eccentrically in relation to the toggle lever K. An action pushing away in the opening direction of the pliers is obtained, the pressure-exerting piece 21 shifting the introduction of force into the other link 16 to outside the toggle lever K, that is away from the toggle-joint pin 23, with regard to the eccentric effect.

In this basic position in which spring energy is stored (FIG. 7), the toggle lever K forms an obtuse angle of about 150°, opening on the mouth side.

Figure 8:
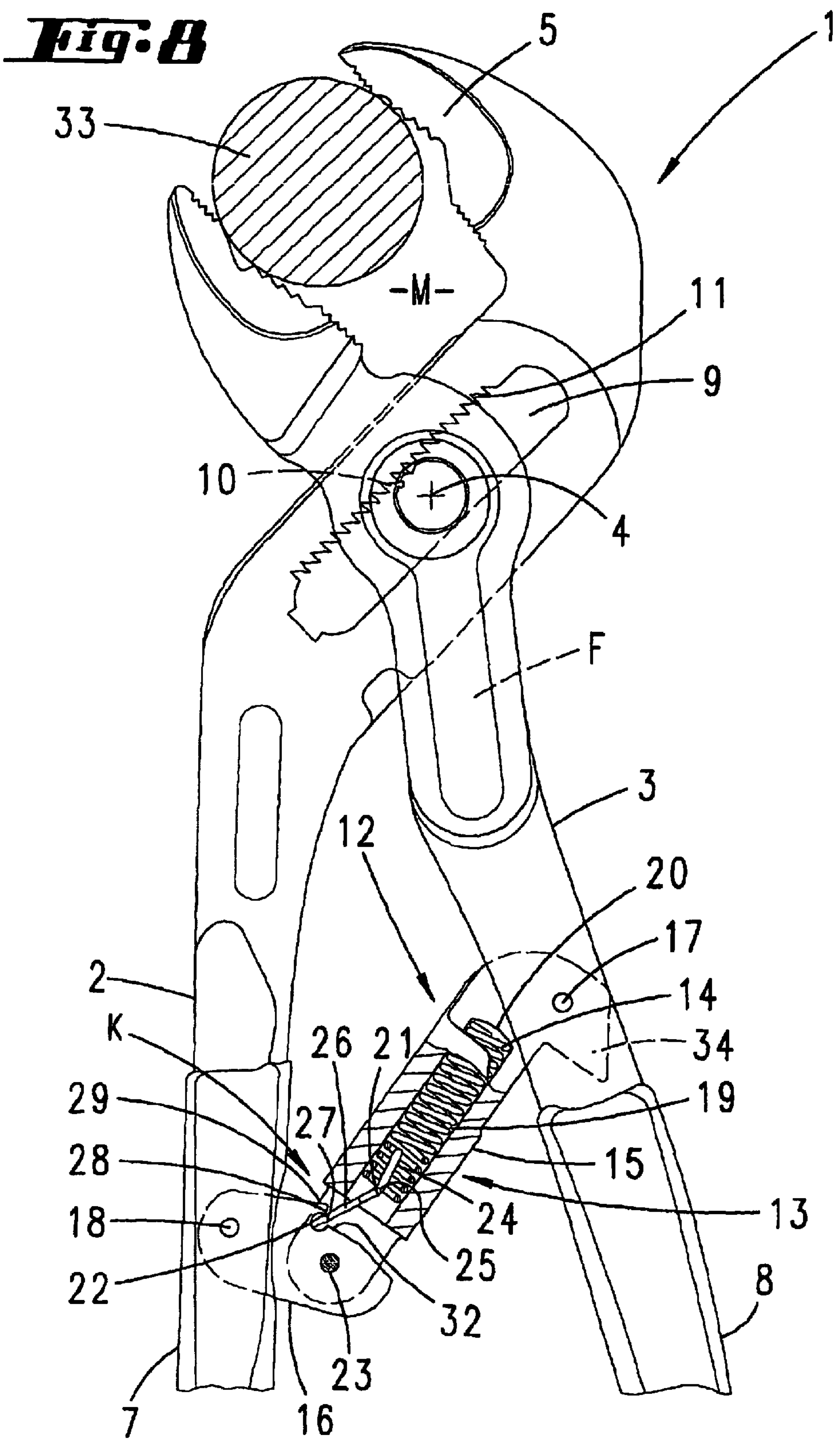
FIG. 8 shows an enlargement of FIG. 5, once again with the control element cut open.
Figure 9:
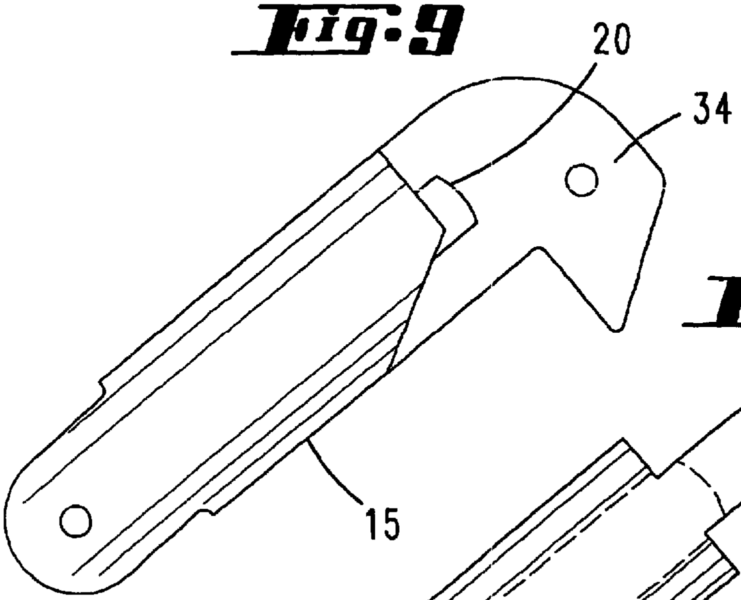
FIG. 9 shows one of the links in side view.
Figure 10:
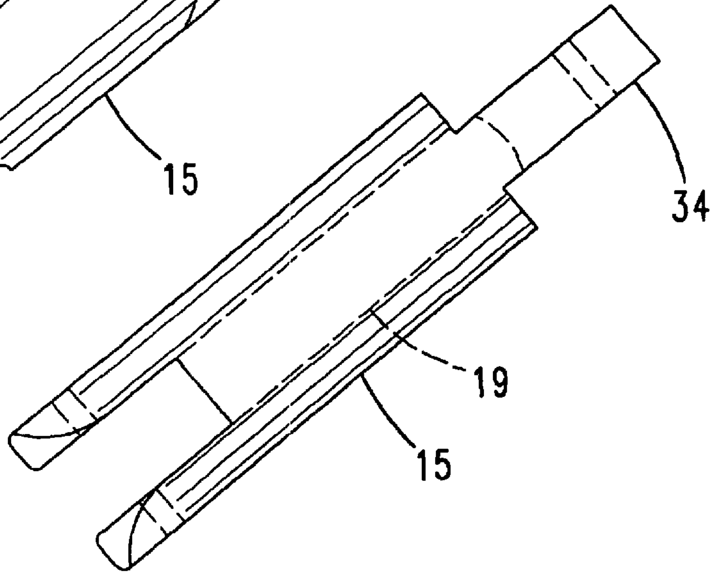
FIG. 10 shows the same in plan view.
Figure 11:
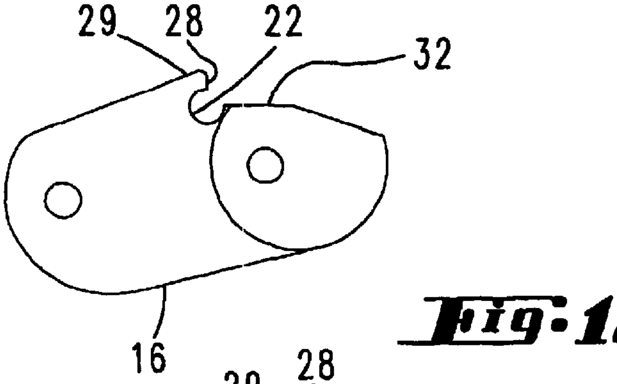
FIG. 11 shows the other link in side view and FIG. 12 shows the other link in plan view.
Figure 12:
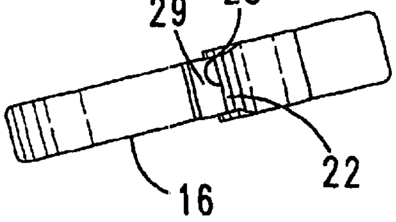
Figure 13:
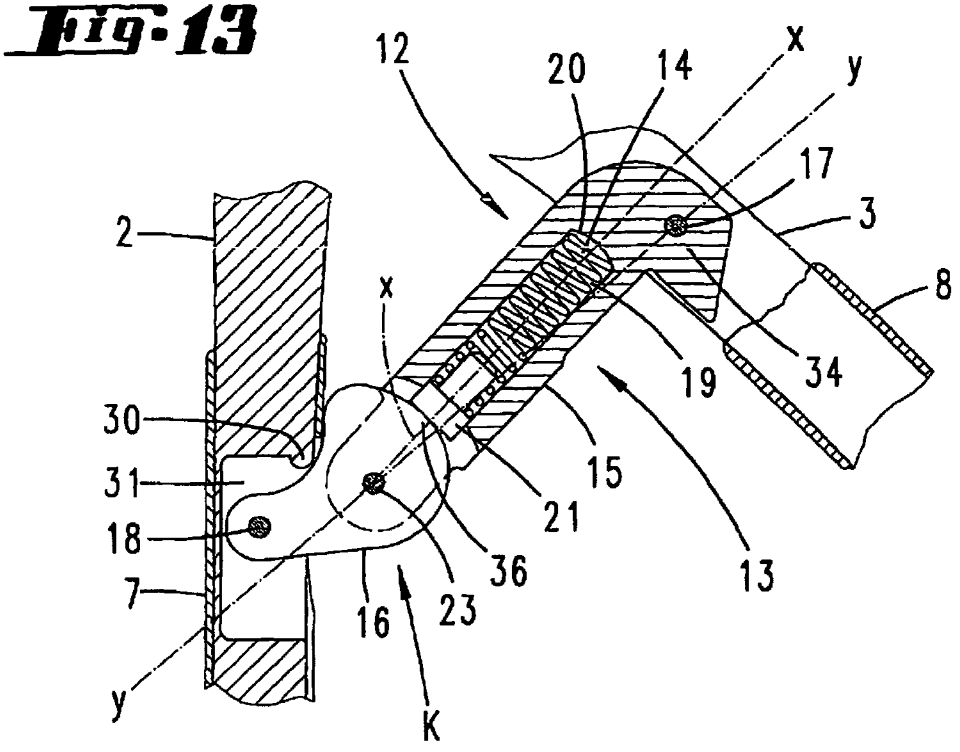
FIG. 13 shows a representation as in FIG. 7, showing a first variant of the control element.

In the operating position according to FIG. 8, the pressure-exerting piece 21 lifts from the parapet 32, increasing the tension of the spring 14. The further-compressed position is likewise shown in FIG. 8. The freedom of movement that is appropriate here between the pressure-exerting piece 21 and the spring 14 is achieved by the neck 24 extending into the compression spring with freedom to pivot.

If the grip portions 7, 8 are released in the stage shown in FIG. 8, the restoring force of the spring 14 has the effect, via the pressure-exerting piece 21, of restoring the pretensioned extended position of the links 15, 16 in relation to one another that is explained above.

FIG. 8 shows the collapsing of the toggle lever that occurs when the pliers are operated by exerting force, that is to say when an object 33 is grasped. According to the position in FIG. 8, this approaches 110°.

It can be gathered that the longitudinal axis x-x of the spring 14 is no longer in line with the straight connecting line y-y between the two points of articulation, joint pin 17 and toggle-joint pin 23 of the first link 15. Accordingly, the transfer into the obtuse-angled extended position of the links 15, 16 takes place by means of the pressure-exerting piece 21, until the basic position that can be seen in FIG. 7 is reached. However, this specification also has another significance: it can be gathered that the joint pin 17 extends in a lug portion 34 of the link 15 offset transversely in relation to the longitudinal axis x-x in the manner of a bracket. The corresponding transverse offset of this lug portion 34 keeps the structurally much larger part of the link 15 in the interstitial region between the pliers legs 2, 3. The lug portion 34 may in this case be of quite a flat form, in order to accommodate it in a guided manner in the correspondingly flat-formed mounting compartment or slit 35 of the pliers leg 3. In this case, the greatest-possible length for the spring chamber 19 is used. The spring 14, or the housing of the link 15 surrounding it, may be formed with much larger cross-sections than the thickness of the flattened lug portion 34.

To sum up, it can be gathered that the spring drive 12 is responsible for pretensioning the pliers mouth M into an open position. The control element 13, on the other hand, controls the phases of movement in such a way that, in a first phase of movement, the pliers-mouth jaws 5, 6 move toward one another and, in a second phase of movement, the catch 10 of the engagement bolt 4 engages in the intertooth gaps 11, only after which the forced rotation of the movable pliers-mouth jaw 6 can be carried out about the engagement bolt 4.

The variants of the toggle lever K that are represented in FIGS. 13 to 16 correspond in their basic configuration to the solution according to the basic version (here for example FIG. 7). The reference numerals are used analogously, in some cases without repeating the text. It is still the case that, with regard to the eccentric effect, the pressure-exerting piece 21 shifts the introduction of force into the other link 16 to outside the toggle joint K, i.e. the toggle-joint pin 23. The spring 14, formed as a compression spring which can be changed in its length, thereby acts in a way corresponding to the longitudinal direction of the link 15 accommodating it.

Figure 14:
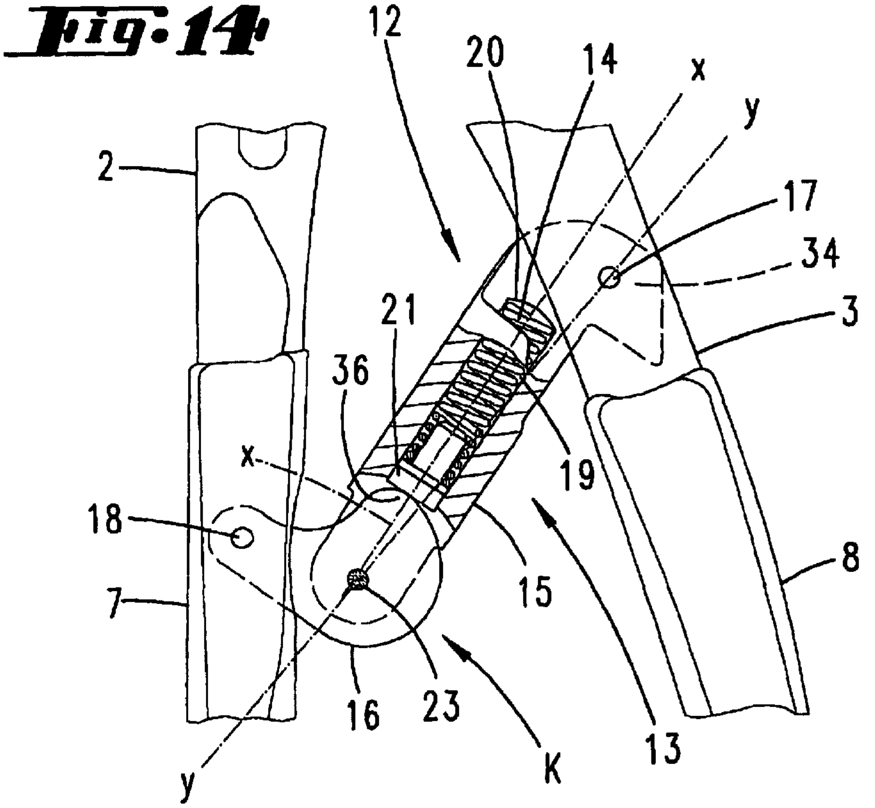
FIG. 14 shows the same in a representation as in FIG. 8.
Figure 15:
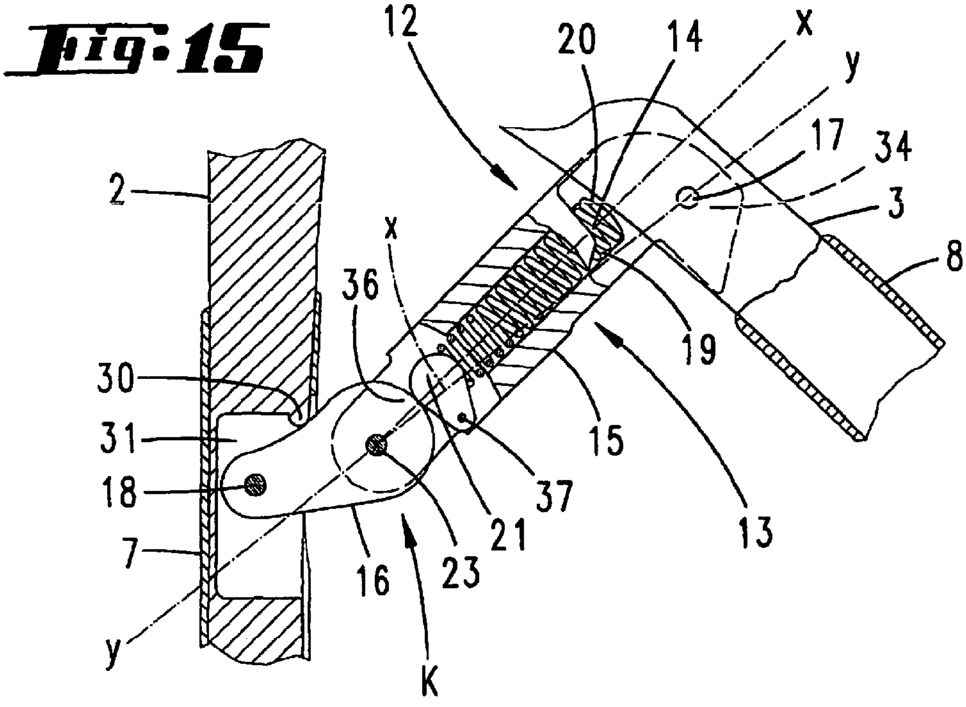
FIG. 15 shows a representation as in FIG. 7, showing a second variant of the control element.
Figure 16:
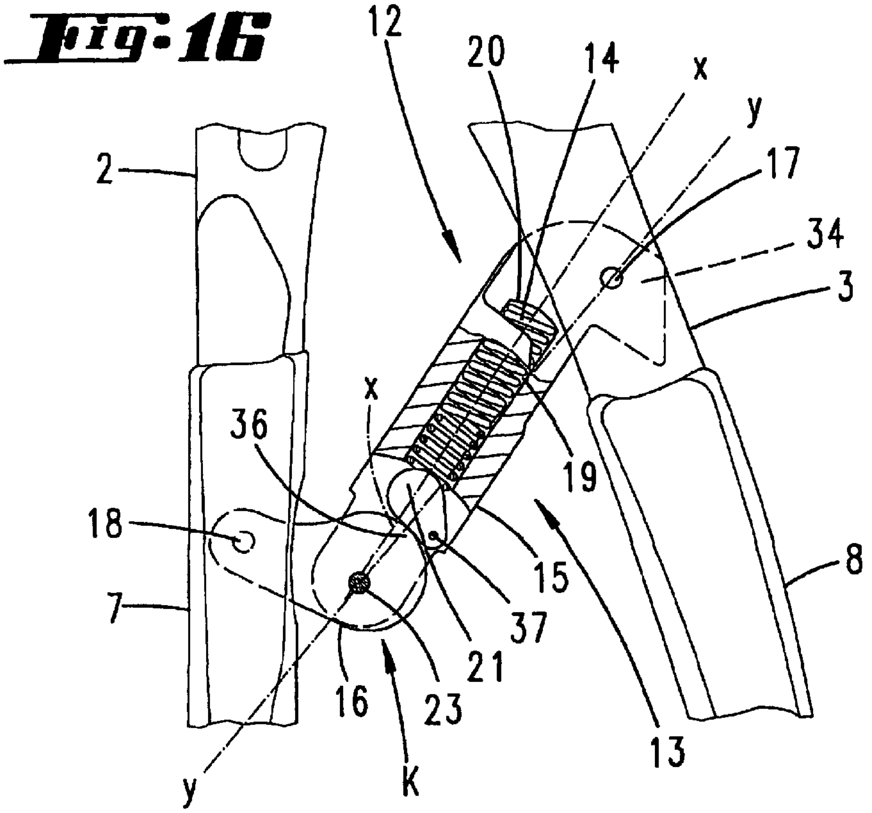
FIG. 16 shows the same in a representation as in FIG. 8.

According to the first variant, the pressure-exerting piece 21, which here again is inserted into the winding cavity of the spring 14, loads the other link 16 in the sense of making the pliers legs 2, 3 spread apart, the only difference here being that the pressure-exerting piece 21 presses onto an eccentrically formed-on end 36 of the link 16. By operating the pliers legs 2, 3 in the closing direction, the spring 14 is compressed via the pressure-exerting piece 21 by the eccentrically formed end 36. Reference should be made to FIG. 14. The distance of the eccentric curve from the pin 23 becomes increasingly greater in the folding direction of the links. Release of the pliers legs 2, 3 has the effect that the pliers 1 resume their basic position. This is by means of the control-cam-like silhouette of the end 36. The stop means are in principle the same, although the means securing the pressure-exerting piece 21 is not needed here. Rather, the latter is captured between the end 36 and the spring 14.

As far as a second variant is concerned, the pressure-exerting piece 21 is provided here by a link element. The latter is seated pivotably on a lateral joint pin 37. Its end 36, thickened in the form of a lobe, is under the loading of the spring 14, which keeps the pressure-exerting piece 21 in rubbing contact with the eccentric sliding surface portion or curve of that end 36 of the link 16. Here, too, the eccentricity acts in the sense described.

Also conceivable, but not represented, would be a solution according to which the pressure-exerting piece 21 is connected in an articulated manner to the corresponding end winding of the spring and acts in an articulated manner eccentrically on the end 36 of the link 16.

Figure 17:
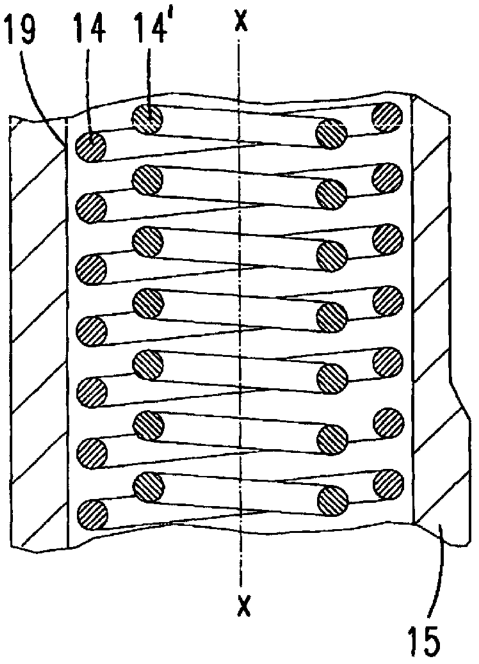
FIG. 17 shows a portion of one of the levers in section, greatly enlarged, showing a double spring arrangement.

To provide a greater spring force, according to FIG. 17 a double configuration is shown and used. The springs, realized there as helical compression springs, are designated by 14 and 14', the latter being inserted in the winding cavity of the one designated by 14.

Figure 18:
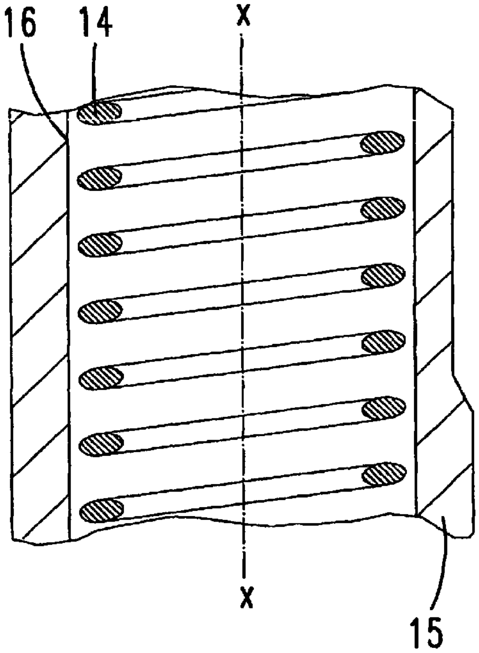
FIG. 18 shows a representation as in FIG. 17, illustrating a flat spring arrangement with respect to the cross-section.
Figure 19:
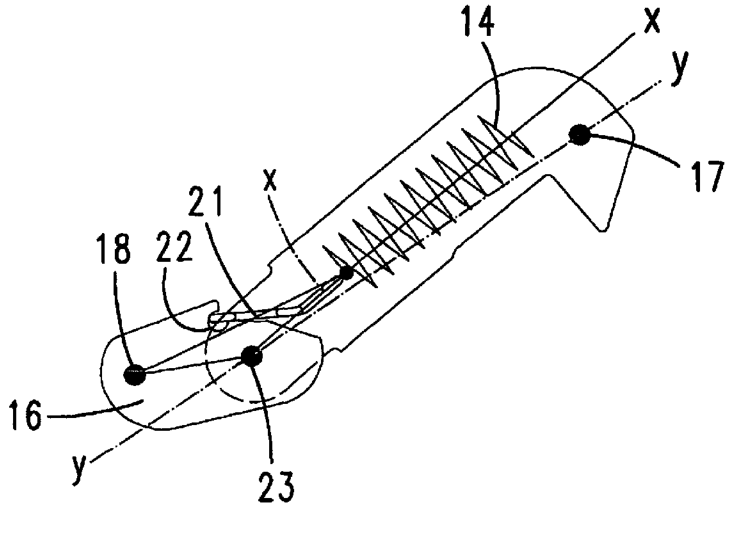
FIG. 19 shows a largely schematized representation of the toggle lever.
Figure 20:
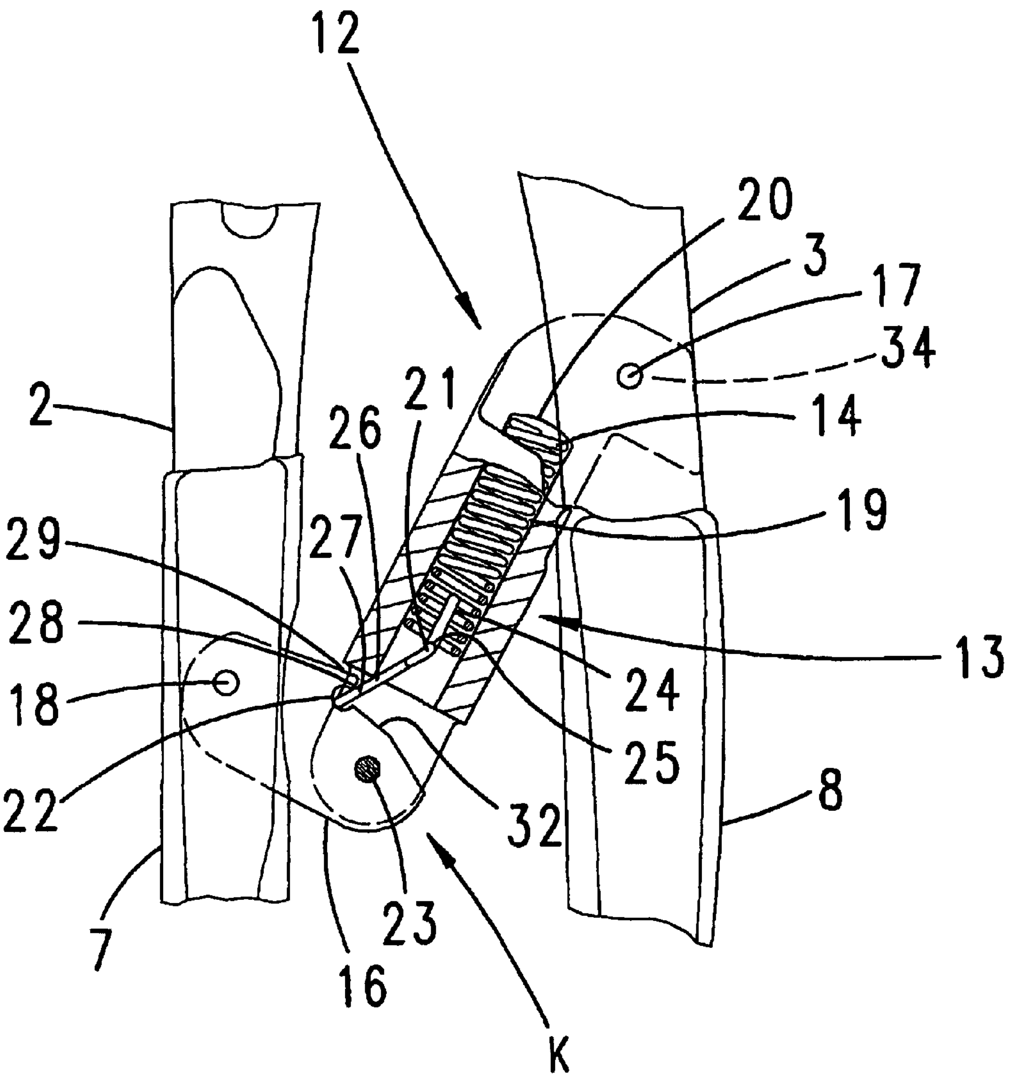
FIG. 20 shows a representation corresponding to FIG. 8, but fully closed, if appropriate kept in this position by a releasable securing means.

According to the proposal of FIG. 18, the spring 14 is formed as a flat spring with respect to the cross-section, on the basis of an elliptical cross-section. The longer axis of the ellipse is substantially perpendicular to the longitudinal axis x-x. The minor or shorter axis corresponds to approximately half the major axis.

Figure 29:
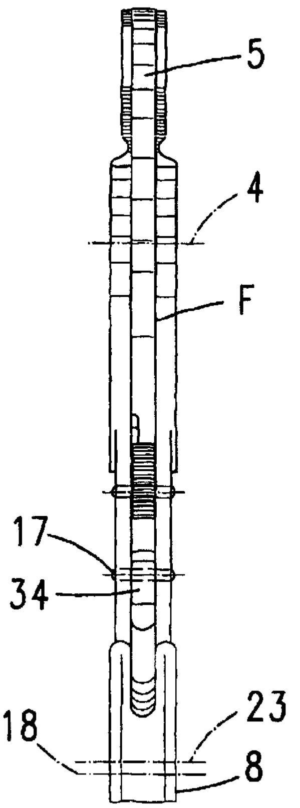
FIG. 29 shows the pliers in side view.
Figure 28:
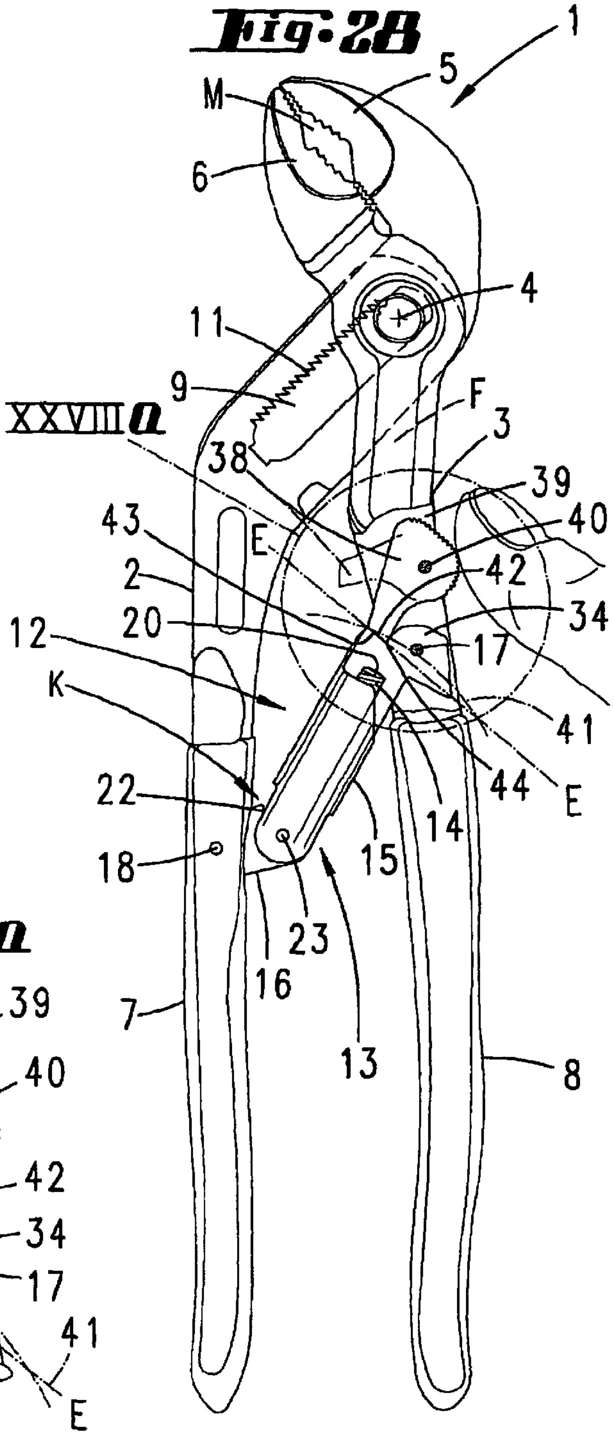
FIG. 28 shows pliers equipped with a securing means, in the closed position.
Figure 28A:
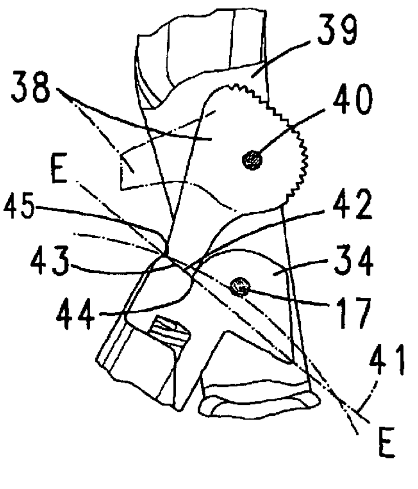
FIG. 28*a* shows an enlargement XXVIIIa taken from FIG. 28.

Now to the subject matter of the development that is initially illustrated by FIGS. 28, 28*a* and 29. Said development relates to means for securing the closed position for the pliers 1 at the times when they are not in use. In such a closed position, the grip portions 7, 8 of the pliers 1 are kept in a space-saving manner close together and reversible.

For this purpose, a blocking part 38 is installed. It is double-armed and accommodated in a rotationally guided manner in a gap 39 of the passed-through pliers leg 3.

The blocking part 38 is pivotably mounted on a pivot pin 40 crossing the gap 39. The geometrical axis of the pivot pin 40 extends spatially parallel to the relevant geometrical axis of the joint pin 17, which provides a mounting for the end on the link side of the first link 15.

The blocking part 38, formed in a double-armed manner, has an arm which is accessible for operation, preferably roughened on the rear, and an arm which interacts in a blocking manner with the first link 15. The latter arm can, for this purpose, be pivoted into a path of movement 41 of the first link 15. The radius point of this path of movement 41 is provided by the toggle-joint pin 23, the radius point of the blocking part 38 is provided by the pivot pin 40.

In the closed position, the mutually associated engagement areas 42, 43 of the blocking part 38 and of the first link 15 extend in a plane E-E, which forms a secant with respect to a circle of the point 44 remote from the pivoting axis of the blocking part 38. In terms of a pivoting mechanism, this produces a wedge-shaped undercut, which acts in a self-blocking manner on the securing means achieved by using the force of the spring 14. The point 45 at the thin end of the wedge, closer to the pivoting axis of the locking part 38, lies at the point of intersection of the path of movement 41 and the plane E-E (cf. FIG. 28*a*). The other point of intersection is located close to the outer side of the pliers leg 3.

For unblocking, it is necessary for the grip portions 7, 8 to be brought slightly closer, which is still possible, to lift the engagement areas 42, 43 from one another, in order in this way to allow the clockwise turning of the blocking part 38 to be brought about. Once the engagement area 42 of the blocking part 38 has left the overlapping region of the path of movement 41, that is to say the engagement area 43 of the first link 15, the pliers 1 can open up, and therefore assume the open position.

In the reverse sense, the pliers 1 are closed and the blocking part 38 pivoted counterclockwise into the active blocking position. The latter cannot be overcome because of a hump-shaped stop, formed by the periphery of the lug portion 34, in the vicinity of the joint pin 17, starting from the point 44.

The release position of the blocking part 38 is indicated by lines of a dashed-dotted kind. It can be gathered that it is ergonomically advantageous for this to be at the end of the grip portion 8 on the pliers head side.

Figure 31:
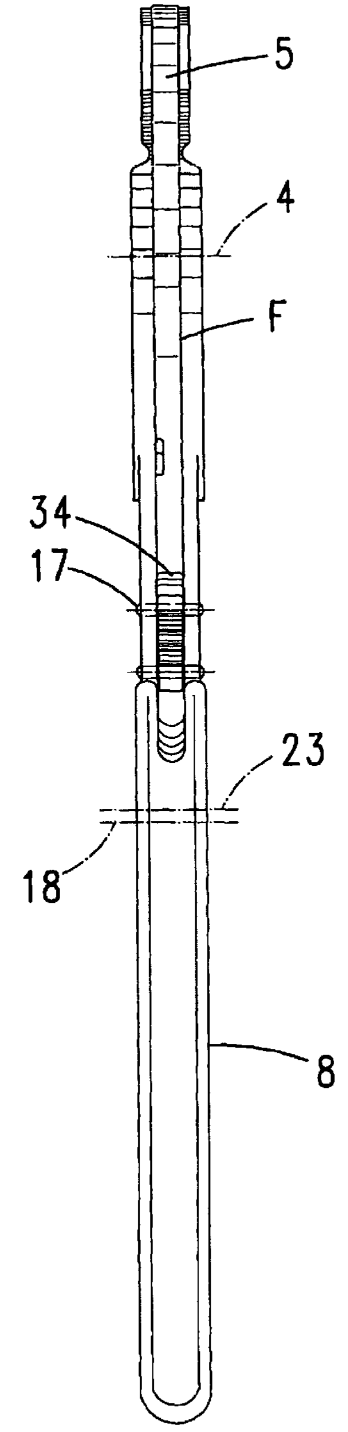
FIG. 31 shows the side view of this.
Figure 30:
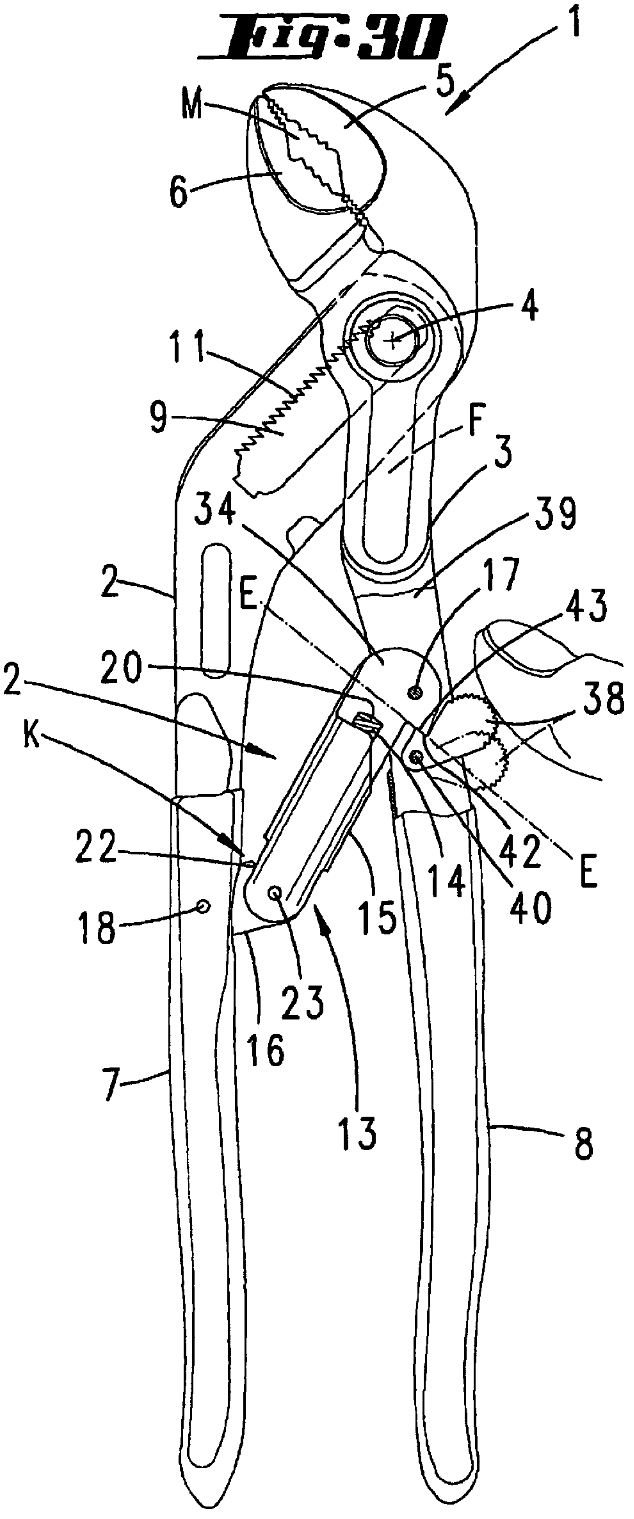
FIG. 30 shows pliers equipped with a modified securing means, in the closed position.

The securing means represented also applies in principle with respect to the variant represented in FIGS. 30 and 31, according to which the blocking part 38 is not mounted above the lug portion 34 but below the lug portion 34. Here, too, the explained taper acts in the sense of a self-securing means that can be deliberately overcome.

The double-armed form of the blocking part 38 is functionally provided here, i.e. in the sense of an operating portion and a blocking portion disposed away from it.

What is important is the proximity of the blocking part 38 to the grip portion. It is disposed in such a way that it can be comfortably reached by the thumb of the hand holding the pliers.

FIGS. 21-27 illustrate a pin mounting technique which makes it possible to dispense with the classic elements such as screws, rivets etc. for the engagement bolt 4. This is achieved in the crossover region of the pliers legs 2, 3 by the engagement bolt 4 being able to be inserted into the pliers legs 2, 3 in an assembly position which is characterized by spreading of the same beyond the fixed open position, and that the engagement bolt 4 is mounted with positive engagement by the pliers legs 2, 3 in the fixed open position.

Figure 21:
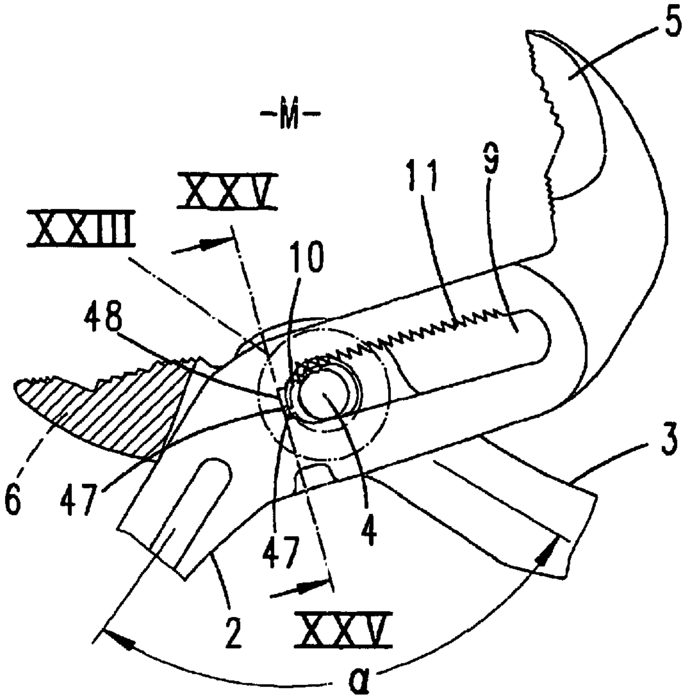
FIG. 21 shows a representation of the crossover region of the pliers, showing a ready-for-fitting position of the engagement bolt.
Figure 22:
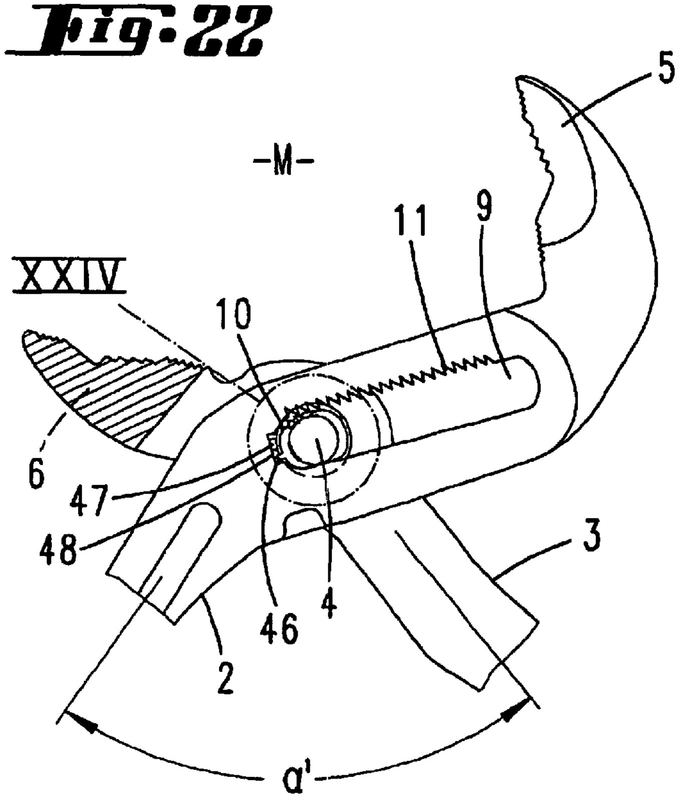
FIG. 22 shows a representation corresponding to FIG. 21 with assembly completed.
Figure 23:
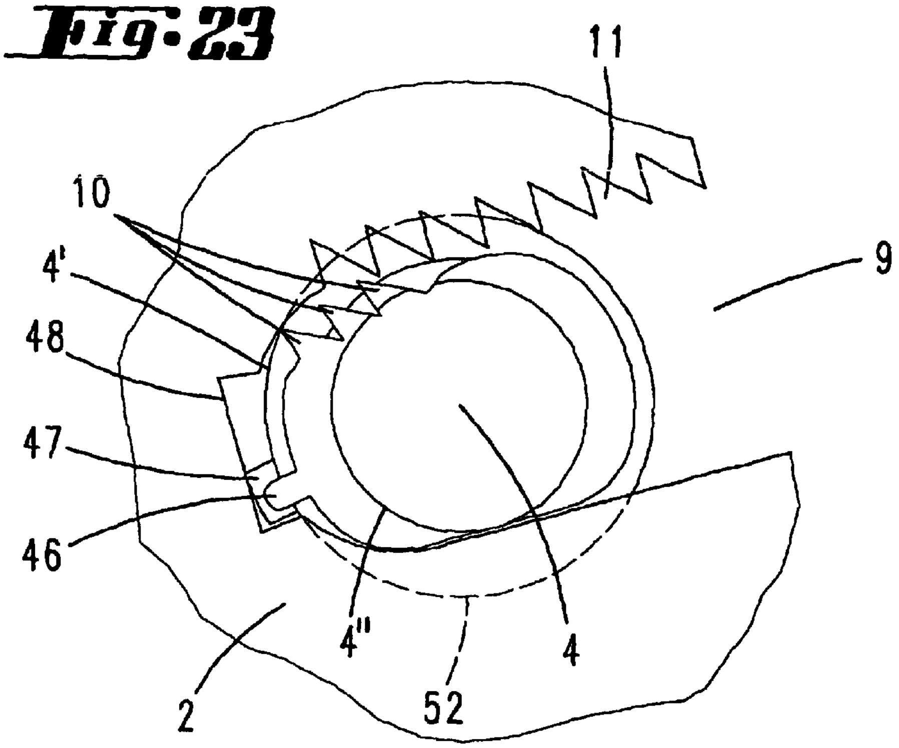
FIG. 23 shows an enlargement XXIII taken from FIG. 21.
Figure 24:
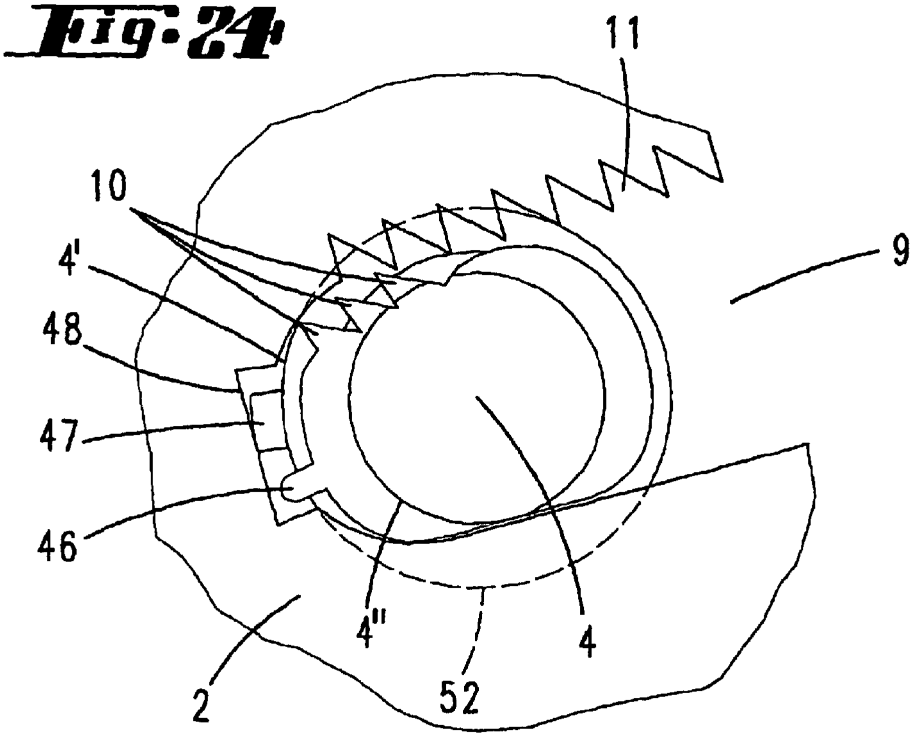
FIG. 24 shows an enlargement XXIV taken from FIG. 22.

The, as it were, over-spread open position of the pliers 1 is illustrated in FIG. 21. In this position, the path for the relative positioning of the engagement bolt 4 is open. In said position, the pliers legs 2, 3 diverge at a clearly greater angle $\alpha$ than in FIG. 22, which shows the fixed open position. The smaller angle is designated there by $\alpha'$.

For setting the pliers 1, the control element 13 forming the spreading block is disengaged.

Figure 25:
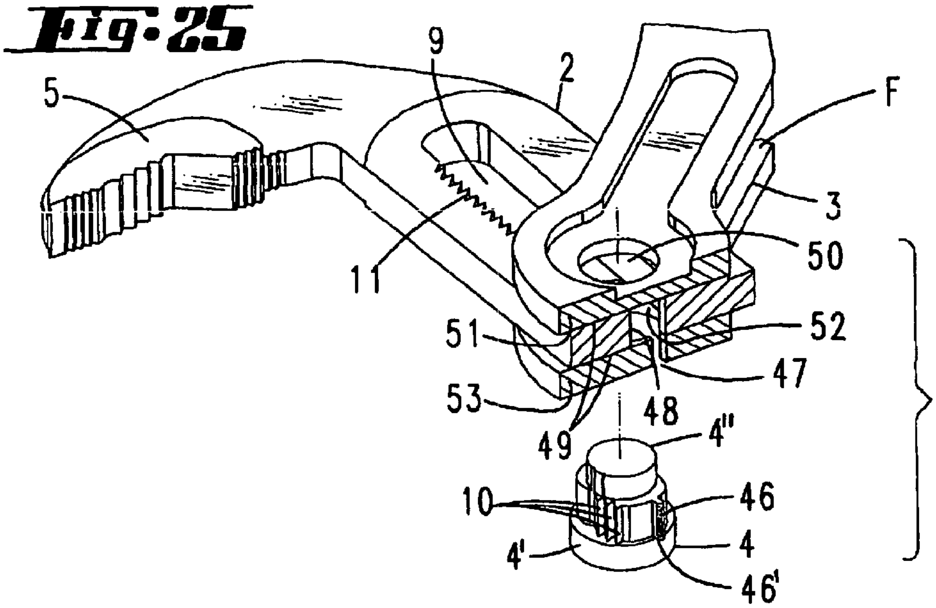
FIG. 25 shows the section along the line XXV-XXV in FIG. 21 with the engagement bolt aligned for fitting by insertion, perspectively.
Figure 26:
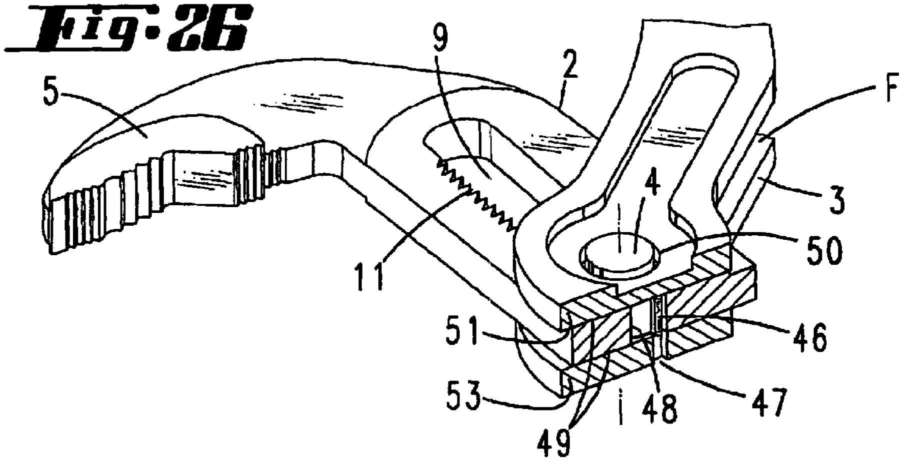
FIG. 26 shows a representation as in FIG. 25, but with the engagement bolt inserted.
Figure 27:
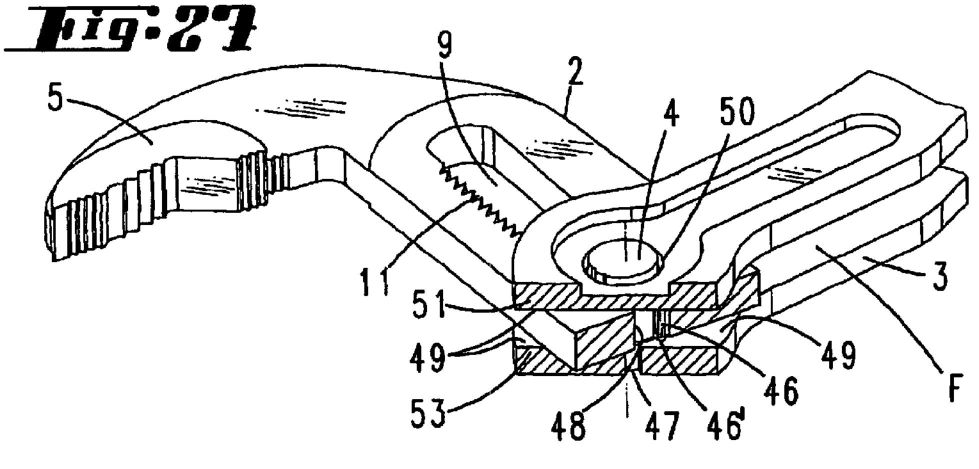
FIG. 27 shows the same with assembly completed and the engagement bolt secured for operation.

The pin mounting takes place, as it were, by way of an angle slit. A blocking portion 46 runs through it. The blocking portion 46 is a finger formed radially onto the engagement bolt 4. Reference should be made to FIG. 25.

When effecting the connection of the engagement bolt 4 by axial insertion, the blocking portion 46 is aligned with an exit opening 47, which correspondingly acts as an entry opening during the relative positioning.

The exit opening 47 is located on the passed-through pliers leg 3. In line with said exit opening 47, axially oriented, is a clearance 48 of the passing-through pliers leg 2. The latter is clearly of a greater width than the exit opening 47, representing a passage for the radial finger. It follows from this that the blocking portion 46 only permits removal of the engagement bolt 4, or conversely its relative positioning, when the exit opening 47 of the passed-through pliers leg 3 is in line with the associated clearance 48 of the passing-through pliers leg 2.

The freedom of movement of the engagement bolt 4 required for the blocking is also provided in the case of this variant of the pliers 1, in that the engagement bolt 4 is pivotably mounted in the passing-through pliers leg 2, to be precise on account of the play-forming width of the longitudinal slit 9 of the passing-through pliers leg 2. There is a limited pivotability, which allows the unlatched position that is represented for example in FIG. 2 and the latched position that is shown in FIG. 5 of the latching tooth formation 10/11.

The clearance 48 is axially delimited, to be precise by the parallel wall areas 49 of the passed-through pliers leg 3 that spatially delimit the fitted-through connection of the pliers legs 2, 3. Said wall areas 49 assume a clear distance from one another corresponding substantially or at most to the axial length of the blocking portion 46.

The clearance 48 is a niche of a width that is a multiple of that of the blocking portion 46 and extends beyond that end of the longitudinal slit 9.

The engagement bolt 4 is of a three-step form in the axial direction, the different diameters being evident from FIG. 25. The steps decrease in the direction of entry, proceeding upward in FIG. 25. In the region of the middle step there is the radially protruding blocking portion 46. Below it lies the bolt portion 4' of greatest diameter. At the other, upper end there is a bolt portion 4" of smallest diameter. It protrudes into a matching mounting bore 50 of an upper wall portion 51 of the passed-through pliers leg 3. By contrast, the bolt portion 4' of greater cross-section is fitted coaxially in a corresponding mounting bore 52 of a lower wall portion 53 of the passed-through pliers leg 3.

In the inserted state in which it is fitted (cf. FIG. 27), the extreme end 46' of the blocking portion 46 remote from insertion is engaged over or under by the corresponding wall area 49 of the lower wall portion 53 in such a way as to prevent it leaving. The exit opening 47 forming the entry aperture is not in line.

Since the fitting of the engagement bolt 4 by insertion takes place in a maximum spread position of the pliers legs 2, 3, which maximum spread position lies outside the operational spread position, fixed by the control element 13, the return path of the engagement bolt 4, in the sense of leaving the mounting bores 50, 52, is barred once the control element 13 has been attached.

The invention claimed is:

1. Pliers that can be operated with one hand, comprising two pliers legs, which pivot in relation to one another about an engagement bolt when a force is applied, the pliers legs also overlapping one another in a crossover region, a pliers mouth being formed on one side of the crossover region of the pliers legs and grip portions being formed on the pliers legs on the opposite side, below the crossover region, the pliers legs also being connected by means of a control element and a spring drive, which pretensions the pliers mouth into an open position, which open position is attained automatically in a spring-loaded manner once the grip portions are released; moreover, in a first phase of movement of the spring drive, jaws of the pliers mouth move toward one another and, in a second phase of movement, a catch of the engagement bolt engaging in a latching tooth formation, after which a forced rotation of the movable jaw can be carried out about the engagement bolt; the control element comprising two links that are connected to one another in the manner of a toggle lever by means of a toggle joint and, associated at least with one link, a spring being provided, which, while being supported on the links, pretensions the links into an extended position and, as a result, brings about the disengagement of the movable pliers leg from the tooth formation and the moving of the movable pliers leg into the greatest open position of the mouth by means of the spring drive, wherein the spring is a compression spring which can be changed in its length along the longitudinal direction of a first one of the links and which, when activated in an axial direction, acts on the second of the links eccentrically in relation to the toggle joint.

2. Pliers according to claim 1, wherein the compression spring is accommodated inside the first link.

3. Pliers according to claim 1, wherein the compression spring acts on the second link by means of a separate pressure-exerting piece.

4. Pliers according to claim 3, wherein, with regard to the eccentric effect, the pressure-exerting piece shifts the introduction of force into the second link to outside the toggle joint.

5. Pliers according to claim 3, wherein the pressure-exerting piece has a neck introduced into the compression spring.

6. Pliers according to claim 5, wherein the neck extends into the compression spring with freedom to pivot.

7. Pliers according to claim 3, wherein the pressure-exerting piece is mounted on the second link via contact with the support.

8. Pliers according to claim 7, wherein the pressure-exerting piece or the support is secured in a step.

9. Pliers according to claim 7, wherein a closed position of the pliers, in the unused state, can be secured by a blocking part that can be pivoted into a path of movement of the first link.

10. Pliers according to claim 9, wherein associated engagement areas of the blocking part and of the first link extend in a plane (E-E) which forms a secant with respect to a circle of a point remote from the pivoting axis of the blocking part.

11. Pliers according to claim 1, wherein a first end of the first link is mounted on the movable pliers leg and a second end of the first link is mounted on the second link.

12. Pliers according to claim 1, wherein the first link is longer than the second link.

13. Pliers according to claim 1, wherein a longitudinal axis (x-x) of the compression spring is not in line with the straight connecting line (y-y) between two points of articulation of the first link.

14. Pliers that can be operated with one hand, comprising two pliers legs, which pivot in relation to one another about an engagement bolt when a force is applied, the pliers legs also overlapping one another in a crossover region, a pliers mouth being formed on one side of the crossover region of the pliers legs and grip portions being formed on the pliers legs on the opposite side, below the crossover region, the pliers legs also being connected by means of a control element and a spring drive, which pretensions the pliers mouth into an open position fixed by the control element and/or the spring drive, which open position is attained automatically in a spring-loaded manner once the grip portions are released; moreover, in a first phase of movement of the spring drive, jaws of the pliers mouth move toward one another and, in a second phase of movement, a catch of the engagement bolt engaging in a latching tooth formation, after which a forced rotation of the movable jaw can be carried out about the engagement bolt, wherein the pliers legs are moveable into an assembly position, beyond the fixed open position, in which assembly position the pliers legs permit the engagement bolt to be slid in axial direction of the engagement bolt into the pliers legs via respective passages in the pliers legs, oriented to receive the engagement bolt, and wherein, in the fixed open position, the relative orientations of the respective passages in the pliers legs is to secure the engagement bolt within the pliers legs.

15. Pliers according to claim 14, wherein the engagement bolt is pivotably mounted in the passed-through pliers leg, to be precised pivotable to a restricted extent on account of the width of the longitudinal slit of the passed-through pliers leg, and in that the engagement bolt has a blocking portion, which permits removal of the engagement bolt only when an exit opening of the passed-through pliers leg is in line with an associated clearance of the passed-through pliers leg.

16. Pliers according to claim 15, wherein the wall areas of the passed-through pliers leg that delimit a free space for a fitted-through connection of the pliers legs assume a clear distance from one another corresponding to the axial length of the blocking portion.

17. Pliers according to claim 15, wherein the extreme end of the blocking portion remote from insertion is engaged over by the corresponding wall area in such a way as to prevent it leaving.

18. Pliers according to claim 15, wherein the engagement bolt, is of a three-step diameter, decreasing in the direction of entry, and carries the blocking portion in the region of the middle step.

19. Pliers according to claim 15, wherein the blocking portion is formed as a radial finger.

* * * * *